United States Patent [19]

Farrah et al.

[11] Patent Number: 5,019,138
[45] Date of Patent: May 28, 1991

[54] OVERSPRAY REMOVAL SYSTEMS FOR COATING BOOTHS OR THE LIKE

[76] Inventors: William J. Farrah, 41 Windemere Pl., Grosse Pointe Farms, Mich. 48236; Jay W. Pease, 16628 E. Jefferson, Grosse Pointe Park, Mich. 48230

[21] Appl. No.: 355,907
[22] Filed: May 23, 1989
[51] Int. Cl.⁵ .......................................... B01D 53/18
[52] U.S. Cl. ........................................ 55/89; 55/240; 55/242; 55/DIG. 46
[58] Field of Search .................. 55/DIG. 46, 89, 93, 55/95, 240, 228, 242, 94, 84

[56] References Cited

U.S. PATENT DOCUMENTS

| | | | |
|---|---|---|---|
| 4,102,303 | 7/1978 | Cordier et al. | 55/85 X |
| 4,120,810 | 10/1978 | Palmer | 252/153 |
| 4,261,707 | 4/1981 | Bradshaw et al. | 55/DIG. 46 X |
| 4,265,642 | 5/1981 | Miy et al. | 55/DIG. 46 X |
| 4,265,944 | 3/1983 | Garner et al. | 55/85 |
| 4,378,235 | 3/1983 | Casper et al. | 55/185 |
| 4,537,120 | 8/1985 | Josefsson | 55/DIG. 46 X |
| 4,750,919 | 6/1988 | Patzelt et al. | 55/45 |
| 4,818,388 | 4/1989 | Morioka et al. | 55/DIG. 46 X |

Primary Examiner—Charles Hart
Attorney, Agent, or Firm—Harness, Dickey & Pierce

[57] ABSTRACT

A method and apparatus for the removal of overspray in coating booths. The systems include a circulating solvent which dissolves the overspray carrier and transports the non-soluble components of the overspray. The systems also include a method and apparatus to remove undesirable elements from the circulation working solvent and to recapture the reusable circulation working solvent to replenish the system.

8 Claims, 1 Drawing Sheet

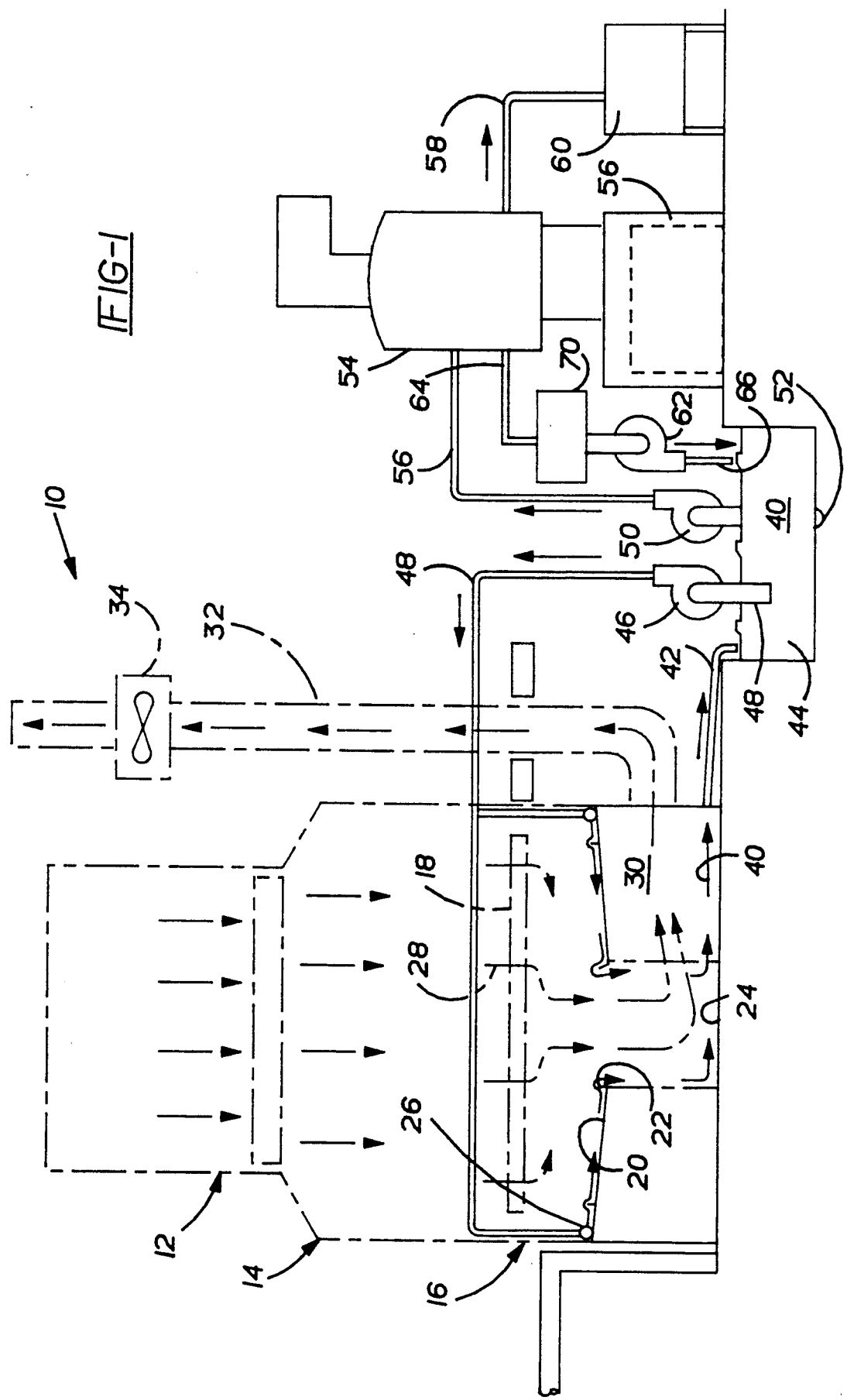

OVERSPRAY REMOVAL SYSTEMS FOR COATING BOOTHS OR THE LIKE

BACKGROUND AND SUMMARY OF THE INVENTION

The present invention relates to coating booth overspray removal systems and, more particularly, to a closed-loop systems which recirculates the working solvent.

In coating operations, it is desirous to reduce overspray to provide an optimum finish on the object being coated. In spray booths or the like, there is generally a ventilation system which draws air downward through a grate into a collection or recovery area. In the collection area, different types of fluid mixtures are used to "kill" or detactify the coating overspray. The "killing" or detactifying of the coating enables the coating to be removed from the collection area without adhering to the sides or removal equipment in the system.

The removal of the overspray coating is of concern in the coatings industry. Particularly, in the automotive industry, where a large number of vehicles are coated with varying types of paints and coating. The removal and disposal of the coating overspray is of great concern.

U.S. Pat. No. 4,750,919 issued June 14, 1988 to Patzelt et. al. illustrates a method for removal of oversprayed paint solids. The method utilizes an oil-in-water emulsion receiving the overspray to "kill" the overspray in the emulsion. Generally, the oil-in-water emulsion includes from 5 to 50 weight percent of an organic liquid having a boiling point of at least 150° C.; from 1.0 to 20 weight percent based on the organic liquid of an oil-in water emulsifier; and the balance water. The oil-in-water emulsion is maintained at a pH value of from 7.5 to 12. The oil-in-water emulsion is continuously circulated in the bath until at least 5 parts by weight of the overspray paint solids for every 100 parts by weight of the organic liquid are received by the oil-in-water emulsion prior to recovery of any material from the emulsion.

While the above system may work satisfactorily, it has disadvantages. In the above system, the paint particles are tied up with the emulsifier which requires continuous removal of the emulsifier layer which, in turn, requires continuous additions of the emulsifier to replenish the emulsion during operation. This is labor intensive and costly to continuously reload the system. Also, continuous monitoring of the pH of the bath must be conducted.

The present invention provides the art with an apparatus and method to reduce the amount of reportable volatile organic compounds. The present invention enables continuous use of the working circulation solvent. The working circulation solvent of the present invention enables portions of the coating overspray to become soluble within the working circulation solvent and other portions of the overspray to be suspended in the working solvent to enable removal of these undesirable elements from the system. Additionally, the system provides for distilling or fractionating of the working solvent to enable removal of undesirable elements and continuous addition of the working circulation solvent back into the system to continuously regenerate the system.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 illustrates a schematic, partially in cross-section view, of a down draft coating booth with an overspray removal system in accordance with the present invention.

DETAILED DESCRIPTION OF THE PREFERRED EMBODIMENT

Referring to FIG. 1, a schematic view, partially in cross-section, is shown of a typical spray coating booth which has been designated with the reference numeral 10. Generally, the coating booth 10 can be broken down into three sections, a treatment section 12, coating section 14 and removal section 16. In the treatment section 12, generally ambient and/or recirculated air is drawn into this section and is heated, humidified or the like. The air is transferred into the coating section 14. In the coating section 14, the object to be coated with a coating, such as paint or the like, is coated while the air is drawn downward around the coated object, collecting the unwanted overspray and drawing the overspray into the removal section 16. Generally, a floor grating 18 is positioned between the coating section 14 and the removal section 16.

Ordinarily, the removal section 16 includes a overspray receiving trough 20 having an opening 22 dropping into a basin 24. Also, a solvent header 26 is present in the receiving trough 20 to circulate a liquid or fluid curtain of working solvent in the receiving trough 20. Overspray 28 is drawn down into the receiving trough 20 and is contacted with the working solvent curtain in the receiving trough 20. A bath of working solvent is present in the receiving trough 20 which overflows, preferably by laminar flow, through the opening 22 to draw the working solvent with the overspray into the basin 24. Optionally, the air that is present at the basin 24 may be passed into an eliminator section 30 where the air is generally passed through a series of baffles or the like. The air is then transferred into an exhaust duct 32 through exhaust fan 34 and may be recirculated into the booth 10, via duct 35, or the air may be exhausted to atmosphere.

The working solvent 40 along with the dissolved overspray 28 and suspension of non-soluble overspray particles, such as pigment, mica or the like, is transferred, via conduit 42, to a sludge pit or collecting area 44. A pump 46 is fluidly coupled to the collecting area 44, via conduit 48, to draw the working solvent from the collecting area 44 to transfer the working solvent to the header 26 for recirculation. Thus, the same working solvent is continuously recirculated throughout the system.

Coating oversprays such as paint generally include resins, solvents and diluents, or the like which are a vehicle or carrier for the pigmented non-soluble "actual" paint particles. When paint dries on the object to be coated these carriers evaporate leaving only the paint or pigment particles on the object. In the case of the overspray, when the overspray is contacted by the working solvent, the carrier is solubilized upon contact with the circulating working solvent. The pigment particles, mica or the like which are the non-soluble portions of the paint are left suspended in the solvent as non-soluble particles. Thus, the working solvent solubilizes the carrier and suspends the non-soluble portions of the coating.

A second pump 50 is fluidly coupled to the bottom of the sludge pit or collecting area 44, via conduit 52. The pump 50 is also fluidly coupled with a distillation mechanism 54, via conduit 56. The pump 50 generally draws a percentage of the working solvent from the collecting area 44 into the distillation mechanism 54.

Due to the working solvent's affinity to dissolve or solubilize the carrier and due to the quantity of working solvent present, the used working solvent may be continuously pumped through the header, and through the system and it will continue to solubilize the overspray. Thus, only a percentage of the working solvent need be distilled to continuously replenish the bath. The continuous replenishing of the bath keeps the affinity of the working solvent high to continue to solubilize the overspray.

The distillation mechanism 54 is generally of the vacuum distillation type, preferably having fractionating and/or dehydration capabilities. In the distillation mechanism 54, the circulated working solvent is distilled and undesirable fluids are removed. Also, in the distillation mechanism 54, as the fluid is distilled, the undesirable non-soluble solid particles are separated from the working circulation solvent. The solid particles may then be acted on to substantially eliminate all solvent in the solid particles.

In applications where the solid particles are acted on, generally the particles are heated within the distillation unit at reduced pressure. Also, the solid waste is introduced to ultra high frequency electromagnetic waves. The wave energy sources are absorbed causing molecular oscillation. This molecular activity coupled with the other forms of energy, forces the solvent into the high energy level of a vapor. The vapor is removed by the distillation mechanism 54, and the waste is condensed and collected in a container 59.

A conduit 58 is coupled with the distillation mechanism 54 to enable removal of the undesirable fluids. The undesirable fluids are transported into a receiving tank 60. The working solvent may be removed from the system at conduit 64. Conduit 64 dispenses recovered working solvent into holding tank 70. The working solvent may be withdrawn from the holding tank 70 and used for booth maintenance, (i.e., to clean the booth walls, purge the hoses or in the lawn mower type mechanism utilized to clean the grate 18 of the booth 10). Material not utilized for cleaning will be returned to the bath, via conduit 66. Optionally, a pump 62 may be coupled with conduit 66.

During distillation of the working circulation solvent the different waste fluids, such as paint solvents, purge solvents, cleaning solvents, or other introduced solvents or the like can be identified and captured for proper reuse or disposal. Also, when the solids are acted on, the working solvent is distilled and identified. This recapture of the working solvent and waste liquids enables the operator to identify and document which and what quantity of volital organic compounds have been removed from the working solvent bath.

A solvent particularly useful in the present invention is n-methylpyrrolidone (NMP) supplied by BASF Chemical Division, Parsippany, N.J. N-methylpyrrolidone also known as n-methyl-2-pyrrolidone, as well as other paint and coating solvents such as ketones, glycol ethers, glycol ether acetates, esters, alcohols, aromatics, and combinations thereof may be used in the present invention as the working circulation solvent. Preferred solvents are N-methylpyrrolidone, glycol ethers, and glycol ether acetates and combinations thereof. These solvents exhibit low evaporation, good paint or coating solubility, relatively non-hazardous, and high flash point characteristics. This solvent enables the coating carrier to become dissolved or solubilized therein unlike the "killing" of the coating overspray in present systems. As the solvent contacts the coating overspray or the like, the vehicle portion of the coating is dissolved or solubilized by the working solvent and the non-soluble portion of the coating is held in suspension and transferred along with the working solvent. As the solvent enters into the sludge pit or collecting area 44, the amount of dissolved coating overspray and suspended non-soluble particles will be small compared to the large quantity of working circulation solvent present in the bath of the collecting area 44. Thus, a small percentage of the working circulation solvent may be drawn off and passed through the distillation mechanism 54.

In the distillation mechanism 54, in the case of NMP, generally the lower boiling waste solvents from the purge, cleaning, introduced solvents, or the like and also water present in the working solvent are distilled or fractionated. The distilled lower flash components may be utilized in other operations as fuel or the like or properly disposed. The solid waste material, such as the pigments, mica or the like are removed generally by the above process.

The distilled NMP or working solvent which is not used in the cleaning process is returned into the collecting area 44, via conduit 66. The NMP or working solvent is recirculated via pump 46 into the header 26. The NMP or working solvent curtain is contacted with the overspray and portions of the overspray becomes dissolved or solubilized by the NMP or working solvent in the receiving trough 20. The non-soluble portions of the overspray are present in the NMP or working solvent and move along with the flow of the NMP or working solvent. The bath overflows through opening 22 into the basin 24 and then out through conduit 42 into the collection area 44 drawing the dissolved and non-soluble portions of the coating into the collection area 44. The process continues in the closed-loop system returning the NMP or working solvent to the header 26 to form the fluid curtain to remove the overspray from the spray booth.

In the present invention, theoretically speaking, the working solvent would continue to be used over and over again and would not be replaced. Since the working solvent is continuously distilled to remove the overspray carrier and solid waste particles the supply or quantity of working solvent would remain substantially constant or substantially the same. Due to cleaning procedures, possible evaporation or the like the quantity levels of the working solvent may go down in the bath and require additional working solvent. Thus, the present invention provides the art with a true closed-loop system which does not need additions to regenerate the working solvent, however, working solvent may need to be added for other reasons to the bath.

While the above detailed description describes a preferred embodiment of the present invention, it will be understood that the present invention is susceptible to modification, alteration and variation without deviating from the scope and fair meaning of the subjoined claims.

What is claimed is:

1. A method for removal of overspray in coating booths or the like, said method comprising the steps of:
providing a solubilizing paint solvent adjacent an area where a coating operating is being conducted;
contacting overspray from said coating operation with said paint solvent;
dissolving said coating overspray in said paint solvent such that said paint solvent and coating overspray form a paint solvent solution;
continually circulating said paint solvent solution to maintain said overspray and said paint solvent in the paint solvent solution; and
removing undesirable elements from said paint solvent solution.

2. The method according to claim 1 further comprising circulating a curtain of said paint solvent adjacent said coating operation.

3. The method according to claim 1 further comprising separating undesirable fluids from said paint solvent solution.

4. The method according to claim 1 further comprising separating undesirable solids from said paint solvent solution.

5. A method of removing overspray from coating booths or the like, said method comprising:
circulating a paint solvent adjacent an area where a coating operation is being conducted;
contacting overspray from said coating operation with said paint solvent;
dissolving said coating overspray in said paint solvent such that said paint solvent and coating overspray form a paint solvent solution;
continually circulating said paint solvent solution to maintain said overspray and said solvent in the paint solvent solution;
removing undesirable elements from said paint solvent solution; and
recirculating said paint solvent in said area.

6. The method according to claim 5 further comprising distilling a percentage of the paint solvent solution and returning said distilled paint solvent into said circulating paint solvent solution.

7. The method according to claim 6 further comprising removing undesirable solids from paint solvent solution.

8. The method according to claim 6 further comprising drawing off a percentage of said distilled paint solvent for using as a cleaning fluid in said coating booth.

* * * * *

UNITED STATES PATENT AND TRADEMARK OFFICE
CERTIFICATE OF CORRECTION

PATENT NO. : 5,019,138

DATED : May 28, 1991

INVENTOR(S) : William J. Farrah et al

It is certified that error appears in the above-identified patent and that said Letters Patent is hereby corrected as shown below:

Title page, under U.S. Patent Documents, reference to 4,265,944, "3/1983" should be --5/1981--.

Column 1, line 9, "systems" should be --system--.

Column 2, line 29, "a" should be --an--.

Column 3, line 61, "volital" should be --volatile--.

Column 5, line 5, claim 1, "operating" should be --operation--.

Signed and Sealed this

Twenty-ninth Day of December, 1992

*Attest:*

DOUGLAS B. COMER

*Attesting Officer*      *Acting Commissioner of Patents and Trademarks*